US011920383B2

(12) United States Patent
Bryan

(10) Patent No.: US 11,920,383 B2
(45) Date of Patent: Mar. 5, 2024

(54) RESTRAINT SYSTEM

(71) Applicant: Michael Bryan, Greenville, SC (US)

(72) Inventor: Michael Bryan, Greenville, SC (US)

(73) Assignee: Michael Bryan, Greenville, SC (US)

( * ) Notice: Subject to any disclaimer, the term of this patent is extended or adjusted under 35 U.S.C. 154(b) by 0 days.

(21) Appl. No.: 16/912,187

(22) Filed: Jun. 25, 2020

(65) Prior Publication Data

US 2021/0404223 A1 Dec. 30, 2021

(51) Int. Cl.
*E05B 75/00* (2006.01)

(52) U.S. Cl.
CPC .................................... *E05B 75/00* (2013.01)

(58) Field of Classification Search
CPC .................................. E05B 75/00; A61F 5/37
USPC ........................................................ 70/16–19
See application file for complete search history.

(56) References Cited

U.S. PATENT DOCUMENTS 691,941 A 1/1902 Headson
738,983 A 9/1903 Burdick
1,803,280 A 4/1931 Stull et al.
2,324,183 A * 7/1943 Wilson .................... E05B 75/00 2/300
4,162,622 A 7/1979 Daleo
5,031,639 A * 7/1991 Wolfer .................. A61F 5/3723 128/869
5,461,890 A 10/1995 LeFavor
5,551,086 A * 9/1996 Albanese .............. A61F 5/3723 2/16
5,551,447 A * 9/1996 Hoffman ................. E05B 75/00 128/869
5,680,781 A 10/1997 Bonds et al.
5,706,679 A * 1/1998 Zane ..................... E05B 67/003 70/49
5,794,463 A * 8/1998 McDaid .............. E05B 73/0005 411/910
5,894,748 A * 4/1999 Capperrune .......... A61F 5/3761 70/18
6,026,661 A 2/2000 Spiropoulos
6,334,444 B1 1/2002 Sisco
6,360,747 B1 * 3/2002 Velarde ................... E05B 75/00 128/869
6,637,077 B2 10/2003 Doty
6,637,242 B2 10/2003 Masters
7,866,321 B2 1/2011 DePetrillo
9,038,426 B2 5/2015 Flynn
9,314,013 B2 4/2016 Mancuso, Jr.
9,828,791 B2 11/2017 Lash
10,036,184 B1 * 7/2018 Sims ...................... A01K 15/04
10,400,483 B2 9/2019 Sims (Continued)

FOREIGN PATENT DOCUMENTS

WO WO-9738194 A1 * 10/1997 ............. E05B 75/00
WO WO 2000066861 A1 11/2000
WO WO-2006135921 A2 * 12/2006 ........... A61F 5/3723

*Primary Examiner* — Suzanne L Barrett
(74) *Attorney, Agent, or Firm* — Dority & Manning, P.A.

(57) ABSTRACT

A restraint system includes an elongated member extending between a first end portion and a second end portion. A first handcuff is mounted to the elongated member at the first end portion of the elongated member, and a second handcuff is mounted to the elongated member at the second end portion of the elongated member. A first handle is positioned adjacent the first handcuff, and a second handle is positioned adjacent the second handcuff.

19 Claims, 4 Drawing Sheets

(56) References Cited

U.S. PATENT DOCUMENTS

| | | | | |
|---|---|---|---|---|
| 2002/0000109 | A1* | 1/2002 | Masters | E05B 75/00 70/16 |
| 2002/0148077 | A1* | 10/2002 | Thompson | F16L 3/2336 24/16 PB |
| 2009/0205379 | A1* | 8/2009 | Williams | E05B 75/00 70/16 |
| 2010/0229608 | A1* | 9/2010 | Dapkins, Jr. | A61F 5/3723 24/265 R |

* cited by examiner

RESTRAINT SYSTEM

FIELD OF THE INVENTION

The present subject matter relates generally to restraint systems or handcuffs.

BACKGROUND OF THE INVENTION

Law enforcement personnel frequently use handcuffs to secure an individual's wrists together. The handcuffs are locked on the individual's wrists and cannot be removed without a key. When secured together with handcuffs, an individual cannot move his or her wrists more than a few inches apart, making many tasks difficult or impossible. Law enforcement personnel can more easily and/or confidently control a handcuffed individual due to such restricted movement.

Known handcuffs generally work well to secure the individual's wrists when the individual's wrists are placed close together behind the individual's back. However, known handcuffs have drawbacks. For instance, an individual may be uncooperative such that properly positioning the individual's wrists for securement by handcuffs is difficult. The individual may be lying face down with his or her wrists located below his or her chest. In such a position, moving the individual's wrists to the proper location for securing with the known handcuffs can be extremely difficult and require law enforcement personnel to pry the individual's arms from beneath his or her chest, a tiresome, and potentially dangerous, situation.

BRIEF DESCRIPTION OF THE INVENTION

Aspects and advantages of the invention will be set forth in part in the following description, or may be apparent from the description, or may be learned through practice of the invention.

In an example embodiment, a restraint system includes an elongated member that extends between a first end portion and a second end portion. A first handcuff is mounted to the elongated member at the first end portion of the elongated member, and a second handcuff is mounted to the elongated member at the second end portion of the elongated member. A first handle is positioned adjacent the first handcuff, and a second handle is positioned adjacent the second handcuff.

In a first example aspect, the elongated member includes one or both of a cable and a chain.

In a second example aspect, a length of the elongated member between the first end portion and the second end portion of the elongated member is no less than eight inches (8") and no more than sixteen inches (16").

In a third example aspect, the first handle includes a first loop handle mounted to the first handcuff or to the elongated member proximate the first end portion of the elongated member.

In a fourth example aspect, the first loop handle includes one or both of a cable and a chain.

In a fifth example aspect, a sheath is positioned over the one or both of the cable and the chain.

In a sixth example aspect, the second handle includes a second loop handle mounted to the second handcuff or to the elongated member proximate the second end portion of the elongated member.

In a seventh example aspect, a sheath is positioned over the elongated member.

In an eighth example aspect, the sheath includes a fabric webbing.

In a ninth example aspect, the restraint system includes a coupler for selectively connecting the first handle to the second handle.

Each of the example aspects recited above may be combined with one or more of the other example aspects recited above in certain embodiments. For instance, all of the nine example aspects recited above may be combined with one another in some embodiments. As another example, any combination of two, three, four, five, or more of the nine example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
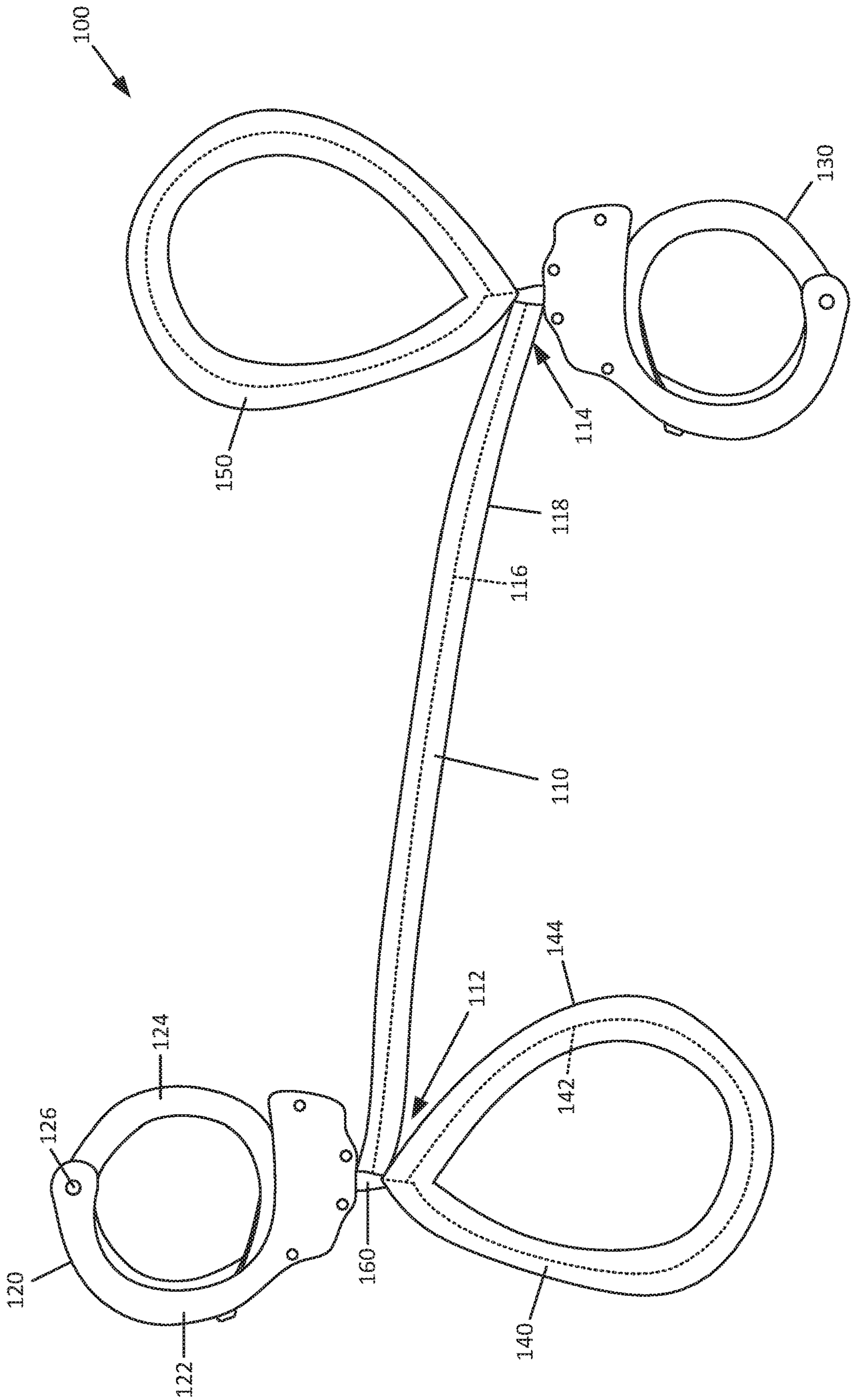
FIGS. 1 and 2 are top plan views of a restraint system according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
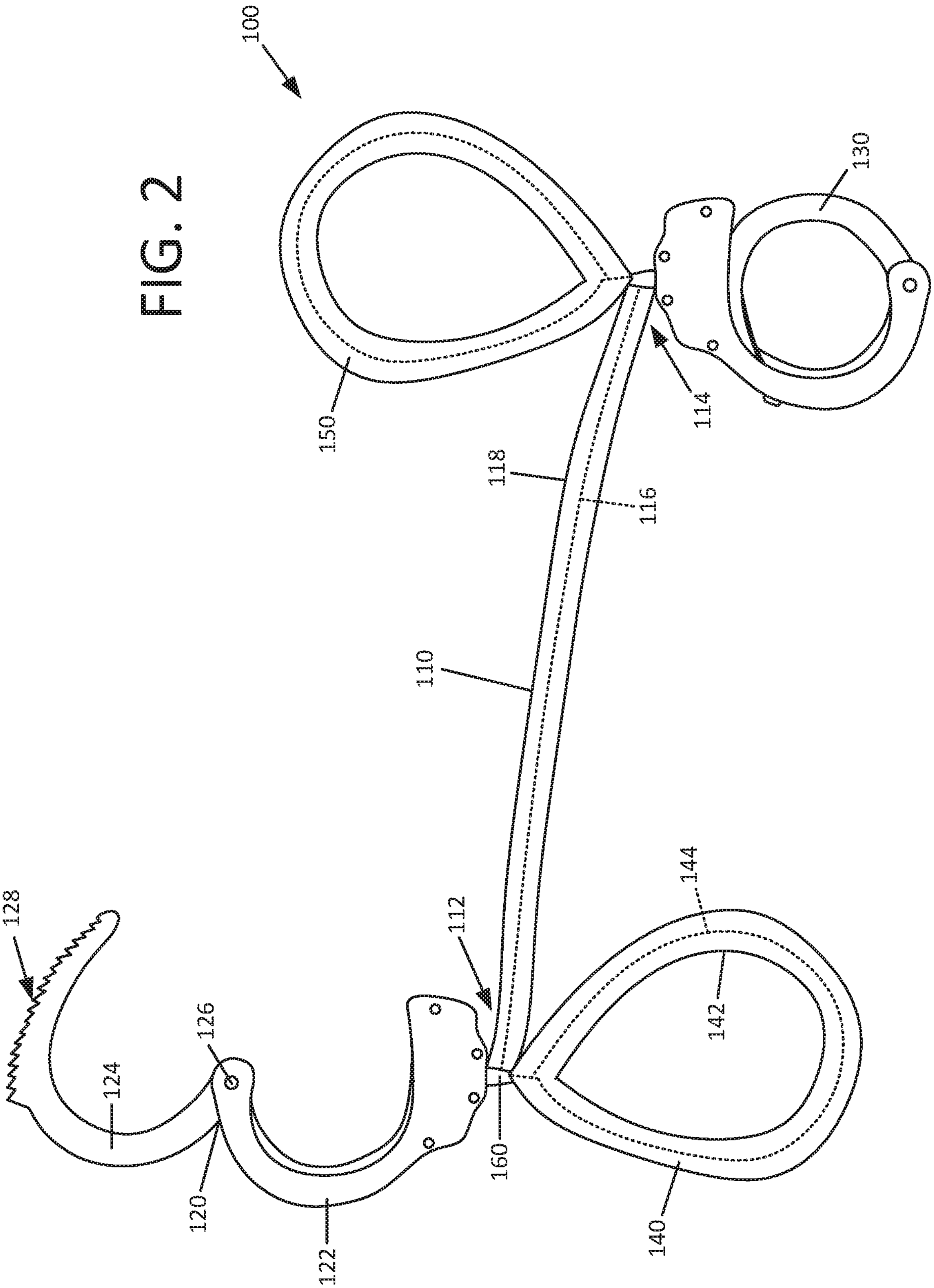

FIGS. 1 and 2 are top plan views of a restraint system 100 according to an example embodiment of the present subject matter. Restraint system 100 is configured for securing the wrists of an individual behind his or her back. For instance, a law enforcement official may utilize restraint system 100 to assist with an arrest or detention of the individual. Restraint system 100 may also be referred to as a pair of handcuffs. As discussed in greater detail below, restraint system 100 includes features for assisting with moving the wrists of the individual, for instance from below the individual when the individual is lying facedown on the ground with his or her wrists positioned under the individual.

As shown in FIGS. 1 and 2, restraint system 100 includes an elongated member 110, a first handcuff 120, and a second handcuff 130. Elongated member 110 may extend, e.g., longitudinally, between a first end portion 112 and a second end portion 114. First handcuff 120 may be mounted to elongated member 110, e.g., at first end portion 112 of elongated member 110. Second handcuff 130 may also be mounted to elongated member 110, e.g., at second end portion 114 of elongated member 110. As may be seen from the above, first and second handcuffs 120, 130 may be positioned opposite each other on elongated member 110.

First and second handcuffs 120, 130 may each be applied or positioned on a respective wrist of an individual. For instance, a law enforcement official may lock first handcuff 120 on one wrist of the individual and lock second handcuff 130 on the other wrist of the individual. Elongated member 110 may couple or connect first and second handcuffs 120, 130. For instance, elongated member 110 may limit a distance by which first handcuff 120 may move relative to second handcuff 130. Thus, when restraint system 100 is applied to the individual, movement of the individual's wrists may be limited by elongated member 110 connecting first and second handcuffs 120, 130.

Elongated member 110 may be any suitable connector for first and second handcuffs 120, 130. For instance, elongated member 110 may be one or both of a chain and a cable 116. The chain/cable 116 may securely and reliably connect first and second handcuffs 120, 130. In addition, because the chain/cable 116 is flexible, elongated member 110 may advantageously coil for storage, e.g., within a handcuff holder on a belt of a law enforcement official. The chain/cable 116 may be disposed within a sheath 118, e.g., between first and second handcuffs 120, 130. Sheath 118 may advantageously protect the chain/cable 116 from damage and/or may advantageously limit tampering with the chain/cable 116. As an example, sheath 118 may be a fabric webbing, and elongated member 110 may extend within the fabric webbing, e.g., between first and second handcuffs 120, 130.

First and second handcuffs 120, 130 may be any suitable handcuffs. Thus, the operation and construction of first and second handcuffs 120, 130 is not described in great detail herein. However, as shown in FIGS. 1 and 2, first handcuff 120 may generally include a first cuff 122 rotatably mounted to a second cuff 124 with a hinge 126. As shown in FIG. 2, when first handcuff 120 is open, first cuff 122 is rotated relative to second cuff 124 such that an opening is formed between first and second cuffs 122, 124 and an interior of first handcuff 120 is open. Thus, a wrist of an individual may be inserted through the opening between first and second cuffs 122, 124 into the interior of first handcuff 120 when first handcuff 120 is open. Conversely, as shown in FIG. 1, when first handcuff 120 is closed, first cuff 122 is rotated relative to second cuff 124 such that first and second cuffs 122, 124 overlap and the interior of first handcuff 120 is closed. Thus, the wrist of the individual between first and second cuffs 122, 124 within the interior of first handcuff 120 may be held by first handcuff 120 due to interference with first and second cuffs 122, 124 when first handcuff 120 is closed.

When first handcuff 120 is closed, rotation of first and second cuffs 122, 124 towards the open configuration of first handcuff 120 may be prevented by a lock within first handcuff 120. For instance, ratchet teeth 128 (FIG. 2) on first cuff 122 may engage a locking pawl (not shown) within second cuff 124 to prevent retraction of first cuff 122 from second cuff 124. A key may be used to release the locking pawl and allow first handcuff 120 to open.

Second handcuff 130 may be constructed in the same or similar manner to first handcuff 120. Thus, the description of first handcuff 120 above is equally applicable to second handcuff 130, and repetitive description of second handcuff 130 is omitted for the sake of brevity.

As noted above, restraint system 100 includes features for assisting with moving the wrists of the individual, for instance from below the individual when the individual is lying facedown on the ground with his or her wrists positioned under the individual. Such features are described in greater detail below in the context of FIG. 3, which is top plan view of restraint system 100 with second handcuff 130 positioned on a wrist of an individual below a body B of the individual and with first handcuff 120 not positioned below the body B of the individual.

When the individual with body B is lying facedown with a hand H positioned beneath the body B, i.e., on the underside U of the body B, moving the hand H from the underside U of the body B can be difficult for the law enforcement official. In particular, the law enforcement official may have difficulty with simultaneously grasping the hand H and getting leverage to pull the hand H from the underside U of the body B to the outside O of the body B, i.e., to a position where the hand H is not located beneath the body B. It can be particularly difficult and/or potentially dangerous for the law enforcement official to remove the individual's hand(s) from below the body B and reposition the hand(s) on the individual's back where conventional handcuffs can restrain the individual's hand(s).

To assist in the above and similar situations, restraint system 100 includes a first handle 140 and a second handle 150. First handle 140 is positioned at or adjacent first handcuff 110. Conversely, second handle 150 is positioned at or adjacent second handcuff 120. Thus, each of first and second handles 140, 150 may be positioned at or adjacent a respective one of first and second handcuffs 110, 120. As an example, first handle 140 may be mounted to elongated member 110 at first end portion 112 of elongated member 110, and second handle 150 may be mounted to elongated member 110 at second end portion 114 of elongated member 110. Thus, first and second handles 140, 150 may be positioned opposite each other on elongated member 110. A law enforcement official may pull on one of first and second handles 140 in order to assist with moving a wrist of secured by an opposite one of first and second handcuffs 110, 120, as discussed in greater detail below.

Figure 3:
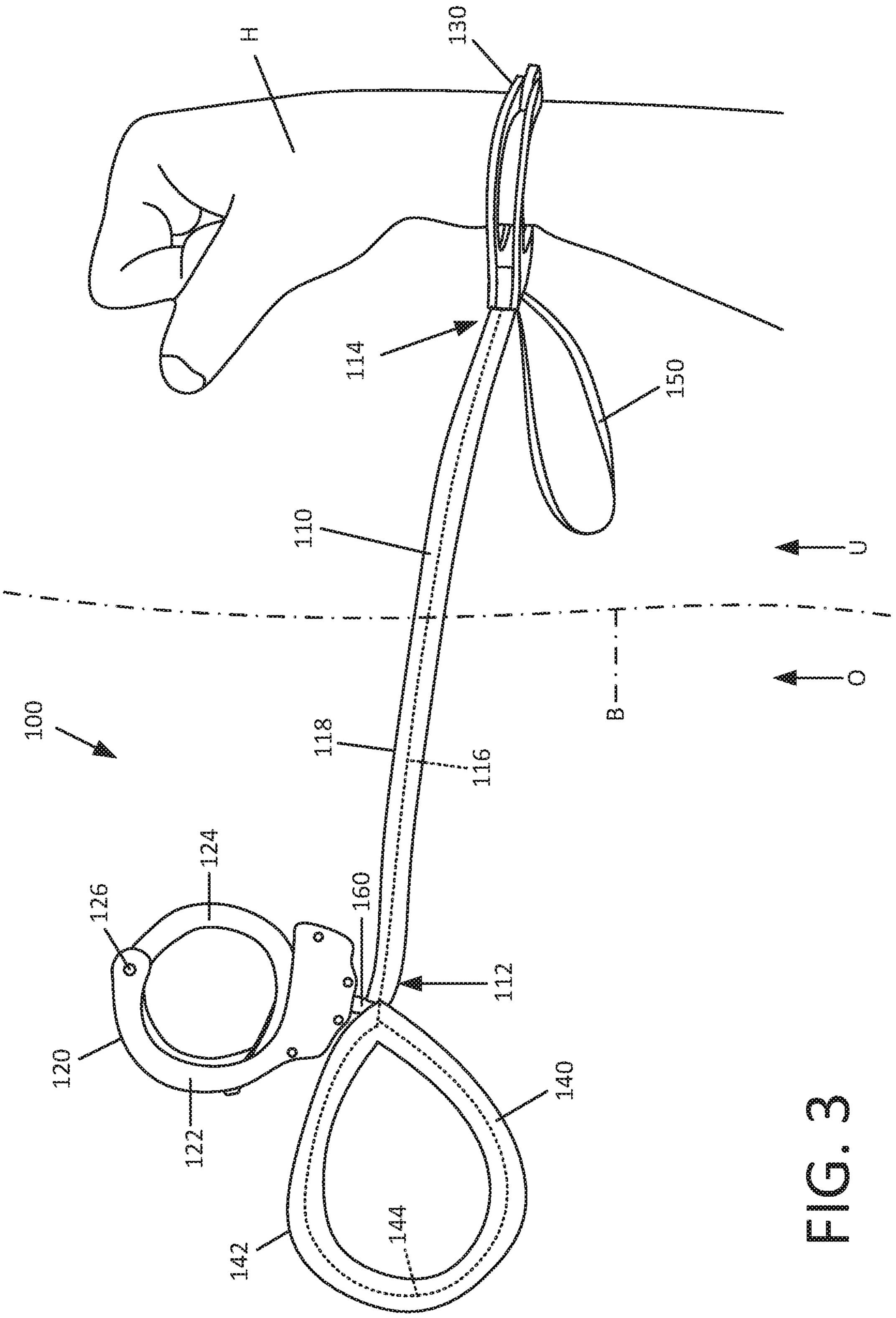
FIG. 3 is a top plan view of the example restraint system of FIG. 1 secured to a hand.

As shown in FIG. 3, an individual with body B may be lying facedown with hand H positioned beneath the body B, i.e., on the underside U of the body B. To secure the hand H behind the back of the body B, a law enforcement official may use restraint system 100 to safely and/or quickly move the hand H from the underside U of the body B.

First, the law enforcement official may secure one of first and second handcuffs 120, 130 to the hand H (second handcuff 130 in FIG. 3). Next, the law enforcement official may grasp the respective one of first and second handles 140, 150 (first handle 140 in FIG. 3). Due elongated member 110, first handle 140 may be conveniently located to the outside O of the body B where the law enforcement official can quickly and easily grasp first handle 140. When the law enforcement official pulls on first handle 140, elongated member 110 transfers the force applied by the law enforcement official to second handcuff 130. The law enforcement official may move the hand H from the underside U of the body B to outside O of the body B by applying sufficient force. Once the hand H is out from the underside U of the body B, the law enforcement official may secure the hand H behind the back of the individual.

Without restraint system 100, the law enforcement official would generally be required to grasp the individual's wrist below the body B and with great exertion wrestle the hand H from the underside U of the body B to outside O of the body B while constantly grasping the individual's wrist. Restraint system 100 provides the law enforcement official with a convenient place to grasp and allows the law enforcement official to apply the required force to move the hand H more easily and/or with greater leverage.

First handle 140 may be a first loop handle as shown in FIG. 3. Thus, first handle 140 may include a loop of material 144, such as cable and/or chain. The loop of material 144 used to form first handle 140 may sized such that a hand of a law enforcement official may be inserted through the loop 144. In such a manner, the law enforcement official may advantageously grasp first handle 140 securely and/or quickly. The loop of material 144 may be mounted to first handcuff 120 or to elongated member 110 proximate first end portion 112 of elongated member 110. For instance, the loop of material 144 may extend through a post 160 of first cuff 122.

When first handle 140 is formed with a loop of cable and/or chain 144, the chain/cable 144 may securely and reliably form first handle 140. In addition, because the chain/cable 144 is flexible, first handle 140 may advantageously coil for storage, e.g., within a handcuff holder on a belt of a law enforcement official. The chain/cable 144 may be disposed within a sheath 142. Sheath 142 may advantageously protect the chain/cable 144 from damage and/or may advantageously limit tampering with the chain/cable 144. In addition, sheath 142 may protect a hand of a law enforcement official grasping first handle 140. As an example, sheath 142 may be a fabric webbing, and chain/cable 144 may extend within the fabric webbing.

Elongated member 110 may have a length between first and second end portions 112, 114 of elongated member 110. The length of elongated member 110 between first and second end portions 112, 114 of elongated member 110 may be selected to assist with moving the wrists of an individual. For instance, the length of elongated member 110 between first and second end portions 112, 114 may be no less than eight inches (8") and no more than sixteen inches (16"). Such sizing of elongated member 110 may advantageously allow securing of one of first and second handcuffs 110, 120 on a wrist of an individual while opposite one of first and second handcuffs 110, 120 (along with the respective one of first and second handles 140, 150) may be located in an area easily graspable by a law enforcement official. In addition, such sizing of elongated member 110 may advantageously allow storage of restraint device 100, e.g., within a handcuff holder on a belt of the law enforcement official when elongated member 110 is coiled. In contrast, leg irons are generally not carried on the belt of the law enforcement official due to the onerous size, weight, etc. of leg irons.

Figure 4:
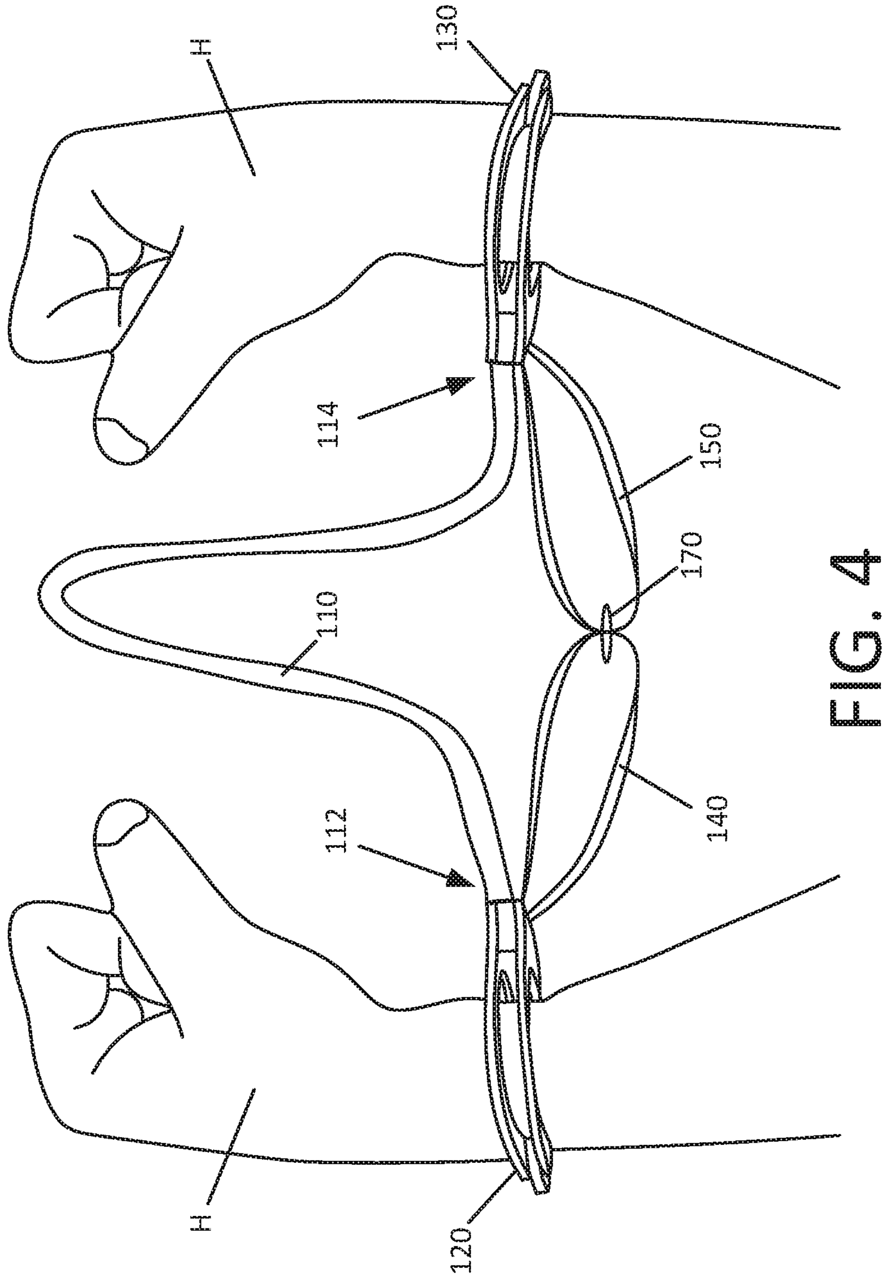
FIG. 4 is a top plan view of the example restraint system of FIG. 1 with handles of the example restraint system secured together with a coupler.

FIG. 4 is another top plan view of restraint system 100. As may be seen in FIG. 4, restraint system 100 may include a coupler 170. Coupler 170 is configured for selectively connecting first handle 140 to second handle 150. In particular, first handle 140 may be directly connected to second handle 150 through coupler 170. By connecting first handle 140 to second handle 150 with coupler 170, an available distance between first and second handcuffs 120, 130 is limited relative to that provided by elongated member 110, and restraint system 100 may function in a manner similar to a conventional set of handcuffs. Thus, coupler 170 advantageously expands the functionality of restraint system 100, e.g., such that restraint system 100 may be used as a supplemental set of handcuffs.

As shown in FIG. 4, elongated member 110 may slack, loop, and/or coil when coupler 170 connects first handle 140 to second handle 150. Thus, the length of elongated member 110 between first and second end portions 112, 114 of elongated member 110 may be greater than the collective length of first and second handles 140, 150 connected by coupler 170. In such a manner, movement of first and second handcuffs 120, 130 away from each other may be restrained by first and second handles 140, 150 rather than elongated member 110 when coupler 170 connects first handle 140 to second handle 150. Coupler 170 may be any suitable connector. For instance, coupler 170 may be a carabiner, a zip-tie, a maillon, a shackle, etc.

As may be seen from the above, restraint system 100 is a useful tool for a law enforcement official, and restraint system 100 may assist the law enforcement official with safely and quickly restraining non-compliant individuals. Restraint system 100 may be conveniently carried on a belt of the law enforcement official, e.g., as a supplement to a conventional set of handcuffs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A restraint system, comprising:

an elongated member extending longitudinally between a first end portion and a second end portion;

a first handcuff fixed to the elongated member at the first end portion of the elongated member;

a second handcuff fixed to the elongated member at the second end portion of the elongated member;

a first loop handle mounted to the first handcuff or to the elongated member at the first end portion of the elongated member; and a second loop handle mounted to the second handcuff or to the elongated member at the second end portion of the elongated member, wherein each of the first and second handcuffs respectively comprise a first cuff rotatably mounted to a second cuff with a hinge, wherein the first cuff of the first handcuff is attached to the elongated member at the first end portion of the elongated member, wherein the first cuff of the second handcuff is attached to the elongated member at the second end portion of the elongated member, and wherein the elongated member does not include a belt buckle for connecting the first and second end portions of the elongated member together as a belt.

2. The restraint system of claim 1, wherein the elongated member comprises one or both of a cable and a chain.

3. The restraint system of claim 1, wherein a length of the elongated member between the first end portion and the second end portion of the elongated member is no less than eight inches and no more than sixteen inches.

4. The restraint system of claim 1, wherein the first loop handle comprises one or both of a cable and a chain.

5. The restraint system of claim 4, wherein further comprising a sheath positioned over the one or both of the cable and the chain.

6. The restraint system of claim 1, further comprising a sheath positioned over the elongated member.

7. The restraint system of claim 6, wherein the sheath comprises a fabric webbing.

8. The restraint system of claim 1, further comprising a coupler for selectively connecting the first loop handle to the second loop handle.

9. A restraint system, comprising:

an elongated member extending between a first end portion and a second end portion, a length of the elongated member between the first end portion and the second end portion of the elongated being member is no less than eight inches and no more than sixteen inches;

a first handcuff fixed to the elongated member at the first end portion of the elongated member;

a second handcuff fixed to the elongated member at the second end portion of the elongated member;

a first handle positioned adjacent the first handcuff; and a second handle positioned adjacent the second handcuff, wherein each of the first and second handcuffs respectively comprise a first cuff rotatably mounted to a second cuff with a hinge, wherein the first cuff of the first handcuff is attached to the elongated member at the first end portion of the elongated member, wherein the first cuff of the second handcuff is attached to the elongated member at the second end portion of the elongated member, and wherein the elongated member does not include a belt buckle for connecting the first and second end portions of the elongated member together as a belt.

10. The restraint system of claim 9, wherein the first handle comprises a first loop handle mounted to the first handcuff or to the elongated member proximate the first end portion of the elongated member.

11. The restraint system of claim 10, wherein the first loop handle comprises one or both of a cable and a chain.

12. The restraint system of claim 11, wherein further comprising a sheath positioned over the one or both of the cable and the chain.

13. The restraint system of claim 10, wherein the second handle comprises a second loop handle mounted to the second handcuff or to the elongated member proximate the second end portion of the elongated member.

14. The restraint system of claim 9, further comprising a sheath positioned over the elongated member.

15. The restraint system of claim 14, wherein the sheath comprises a fabric webbing.

16. The restraint system of claim 9, further comprising a coupler for selectively connecting the first handle to the second handle.

17. The restraint system of claim 1, wherein the elongated member is flexible and the restraint system is sized such that the restraint system is coilable for storage within a belt worn handcuff holder.

18. The restraint system of claim 1, wherein:

the elongated member extends between the first loop handle and the second loop handcuff such that pulling force is transferable by the elongated member from the first handle to the second handcuff.

19. The restraint system of claim 1, wherein:

each of the first and second handcuffs respectively comprise a post on the first cuff;

the first end portion of the elongated member is attached to the first cuff of the first handcuff at the post of the first handcuff; and the second end portion of the elongated member is attached to the first cuff of the second handcuff at the post of the second handcuff.

* * * * *